Feb. 6, 1923.
E. B. CARLSON
PARING KNIFE
Filed Dec. 13, 1921
1,444,659
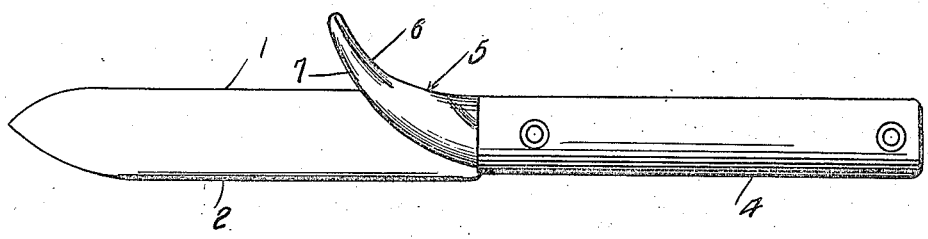
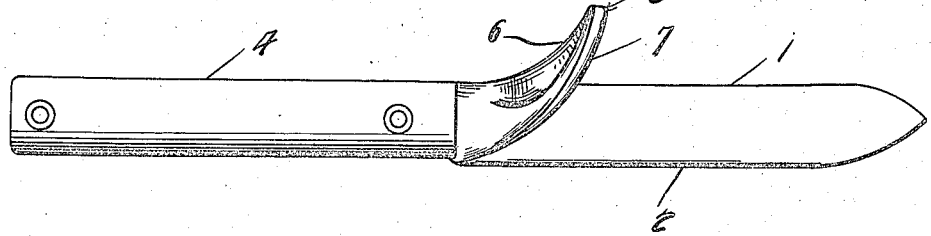
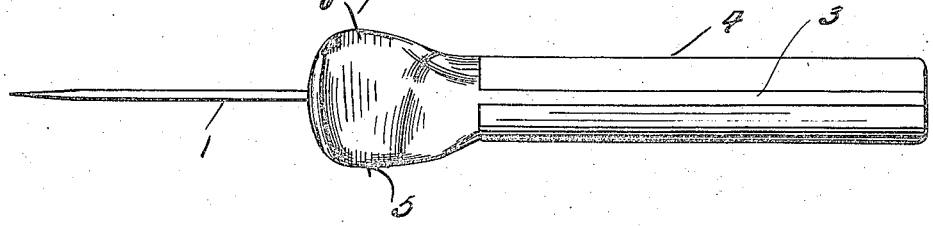
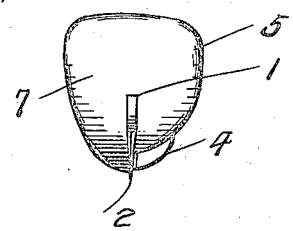
Inventor
E. B. Carlson
By
Attorney Patented Feb. 6, 1923.

1,444,659

UNITED STATES PATENT OFFICE.

EFFIE B. CARLSON, OF ISLE, MINNESOTA.

PARING KNIFE.

Application filed December 13, 1921. Serial No. 522,042.

*To all whom it may concern:*

Be it known that I, EFFIE B. CARLSON, a citizen of the United States, residing at Isle, in the county of Mille Lacs and State of Minnesota, have invented certain new and useful Improvements in Paring Knives; and I do hereby declare the following to be a full, clear, and exact description of the invention, such as will enable others skilled in the art to which it appertains to make and use the same.

This invention relates to new and useful improvements in paring knives and has for its primary object the provision of a shield adapted to prevent the rind from coming in contact with the index finger of a person when peeling the rind from fruit or vegetables, and also provides an effective rest for the index finger to permit the proper pressure to be brought on the knife blade during the act of paring and further prevents the index finger from coming in contact with the fruit or vegetable and thereby obviates staining of the finger.

Another object of this invention is the provision of a paring knife of the above stated character which will be simple, durable and efficient, and which may be manufactured and sold at a comparatively low cost.

With these and other objects in view, as will become more apparent as the description proceeds, the invention consists in certain novel features of construction, combination and arrangement of parts, as will be hereinafter more fully described and claimed.

For a complete understanding of my invention, reference is to be had to the following description and accompanying drawing, in which:

Figure 1 is a side elevation, illustrating a paring knife constructed in accordance with my invention, Figure 2 is a similar view illustrating the other side of the device, Figure 3 is a top plan view illustrating the device, and Figure 4 is an end view illustrating the same.

Referring in detail to the drawing, the numeral 1 indicates a knife blade of any desired shape, having a cutting edge 2 and a shank 3 to which a handle 4 is secured. The handle includes a pair of grip members, between which the shank lies and is secured to. A shield 5 is associated with the knife blade to be engaged by the index finger of the person using the knife to prevent the finger from coming in contact with the fruit or vegetable or the rind peeled therefrom. The shield may be made of any material suitable for the purpose and is preferably made of the same material from which the blade is constructed and forms an integral part of said blade. The shield is located where the blade forms onto the shank to position it at one end of the handle to be engaged by the index finger upon one face, and its other face is adapted to deflect the severed rind from the hand of the person and also away from the index finger. The finger engaged face of the shield is concave and inclined from one side edge to the other or corresponding edge to provide a finger seat 6, of the proper shape to receive and be comfortable to the index finger when the latter is in the act of gripping and placing the necessary pressure on the device during the paring operation. The other or deflecting face 7 of the shield from its outer end to its formation onto the non-cutting edge of the blade is curved gradually throughout its width, while said face at one side of the blade continues the same curve and at the opposite side of the blade the curve is more abrupt to increase the thickness of the shield necessary to permit forming of the inclination of the finger seat 6.

It should be apparent from the foregoing description and drawing that a knife shield has been provided that is comfortable and effective in preventing the rind from engaging the index finger as it is removed from the fruit or vegetable and also that the index finger is prevented from contacting with the fruit or vegetable when paring the same by the knife.

While I have shown and described the preferred embodiment of my invention, it will be understood that minor changes in construction, combination and arrangement of parts may be made without departing from the spirit and scope of the invention as claimed.

Having thus described my invention, what I claim is:

A paring knife including a blade having cutting and non-cutting edges and a handle, a shield formed on the blade at its non-cutting edge and extending on opposite sides of the blade to one end of the handle and projecting beyond the non-cutting edge of said blade, said shield having one face concave and inclined from one side edge to its other corresponding edge to form a finger seat said shield having its other face outwardly curved from the non-cutting edge of the blade to the outer end of the shield and having said last face curved to correspond to the curvature of the first mentioned face at one side of the blade while at the opposite side of said blade the curvature being more abrupt.

In testimony whereof I affix my signature in presence of two witnesses.

EFFIE B. CARLSON.

Witnesses:
C. L. LINDSTROM,
L. H. MATTER.